(12) United States Patent
Konieczka et al.

(10) Patent No.: US 11,912,177 B2
(45) Date of Patent: Feb. 27, 2024

(54) VEHICLE FOR TRANSPORTING PASSENGERS HAVING A VARIABLE NUMBER OF SEATS

(71) Applicant: ALSTOM HOLDINGS, St Ouen sur Seine (FR)

(72) Inventors: Jérôme Konieczka, Dainville (FR); Quentin Marcel Daniel Stocker, Courbevoie (FR); Adrien Ecoue, Issy les Moulineaux (FR)

(73) Assignee: ALSTOM HOLDINGS, Saint-Ouen-sur-Seine (FR)

( * ) Notice: Subject to any disclaimer, the term of this patent is extended or adjusted under 35 U.S.C. 154(b) by 0 days.

(21) Appl. No.: 17/805,838

(22) Filed: Jun. 7, 2022

(65) Prior Publication Data

US 2022/0396185 A1 Dec. 15, 2022

(30) Foreign Application Priority Data

Jun. 9, 2021 (FR) ..................................... 21 06065

(51) Int. Cl.
*B60N 2/24* (2006.01)
*B60N 2/30* (2006.01)
*B64D 11/06* (2006.01)

(52) U.S. Cl.
CPC ............... *B60N 2/30* (2013.01); *B60N 2/242* (2013.01); *B64D 11/0691* (2014.12); *B60N 2002/247* (2013.01)

(58) Field of Classification Search
CPC .............. B60N 2002/247; B60N 2/242; B64D 11/0691
See application file for complete search history.

(56) References Cited

U.S. PATENT DOCUMENTS

| 1,170,343 | A | * | 2/1916 | Rovntree | ............... | B60N 2/203 |
| | | | | | | 297/340 |
| 1,412,367 | A | * | 4/1922 | Noack | ................ | B64D 11/0691 |
| | | | | | | 297/14 |

(Continued)

FOREIGN PATENT DOCUMENTS

| CN | 201183490 Y | 1/2009 |
| CN | 110356296 A | 10/2019 |

(Continued)

OTHER PUBLICATIONS

French Search Report issued for French Patent Application No. FR 2106065, dated Jan. 21, 2022 in 2 pages.

*Primary Examiner* — Timothy J Brindley
(74) *Attorney, Agent, or Firm* — Knobbe, Martens, Olson & Bear, LLP (57) ABSTRACT

A passenger transport vehicle includes a system configured to vary the number of available seating places in accordance with the level of passenger traffic to be transported. The system has a mechanical support structure having a fixed part and a movable part movable between a first position in which the mechanical support structure forms a seating place, and a second position in which the seating place is unavailable for seating. The mechanical support structure includes a covering surface connected to and disposed around a portion of the movable part. The covering surface includes two rigid portions and a deformable portion. One rigid portion forms a seating surface when the movable part is in the first position, while both rigid portions and the deformable portion form an ischiatic support surface when the movable part is in the second position.

14 Claims, 11 Drawing Sheets

(56) References Cited

U.S. PATENT DOCUMENTS

| | | | | |
|---|---|---|---|---|
| 3,011,826 A | * | 12/1961 | Elkins | B64D 11/0643 |
| | | | | 297/383 |
| 11,472,559 B1 | * | 10/2022 | Pacheco | F16C 11/12 |
| 2012/0217779 A1 | * | 8/2012 | Gaither | B64D 11/064 |
| | | | | 297/316 |
| 2018/0281648 A1 | * | 10/2018 | Darbyshire | B60N 2/01 |
| 2022/0072978 A1 | * | 3/2022 | Fitzpatrick | B60N 2/3022 |

FOREIGN PATENT DOCUMENTS

| | | | | |
|---|---|---|---|---|
| CN | 209870614 U | * | 12/2019 | B62D 51/02 |
| CN | 112824205 A | | 5/2021 | |
| DE | 102007042489 A1 | * | 3/2009 | B60N 2/242 |

\* cited by examiner

VEHICLE FOR TRANSPORTING PASSENGERS HAVING A VARIABLE NUMBER OF SEATS

CROSS-REFERENCE TO RELATED APPLICATION

This application claims priority to French Patent Application No. 21 06065 filed on Jun. 9, 2021, the disclosure of which including the specification, the drawings, and the claims is hereby incorporated by reference in its entirety.

FIELD OF THE INVENTION

The present invention relates in general to a passenger transport vehicle, and in particular to a passenger transport vehicle equipped with a system for managing the space inside the vehicle which allows the available space between seated and standing passengers to be adapted to the actual service conditions, and especially to the density or quantity of passengers carried during the different moments of service.

BACKGROUND OF THE INVENTION

It is well known that passenger transport means, such as trains, metros and buses, are increasingly used worldwide.

As a result, particularly in some areas, such as large urban centres, the vehicles or trains used are very congested for at least part of their service, and especially during peak hours.

Since the vehicles in use today have a predetermined capacity and a generally predefined configuration of their interior space, the result is that the comfort on board the vehicle is not optimal, neither during peak hours nor during off-peak hours.

This is because the number of available seating places and their positioning is usually predefined, and during peak hours most passengers have to stand; however, during off-peak hours it is also possible for passengers to stand, even if there is a lot of space available inside the vehicle.

SUMMARY OF THE INVENTION

Therefore, a main purpose of the present invention is to provide a solution offering improvements over the known state of the art, and especially to realize passenger transport vehicles where the use of the space inside the vehicle can be optimised according to the different conditions of use during the operating schedule, in particular according to passenger traffic.

This is achieved by a passenger transport vehicle, comprising a system for managing the space inside the vehicle which is configured to vary the number of available seating places in accordance with the level of passenger traffic to be transported, the management system comprising at least one mechanical support structure having a fixed part and a movable part which is movable, relative to the fixed part, between a first position in which the movable part is extended relative to the fixed part so that the mechanical support structure forms at least one available seating place for passengers, and a second position in which the movable part is retracted towards the fixed part so that the at least one seating place is unavailable for seating, wherein the mechanical support structure comprises at least one covering surface which is connected to and is disposed around at least a portion of the movable part, the covering surface and the movable part moving together substantially solidly with each other, and wherein the at least one covering surface comprises at least a first substantially rigid portion, a second substantially rigid portion, and a third deformable portion which is disposed between the first and second substantially rigid portions and which is connected to the first substantially rigid portion and the second substantially rigid portion, the first substantially rigid portion forming a seating surface when the movable part is in the first position, while the first and second substantially rigid portions form with the third deformable portion an ischiatic support surface when the movable part is in the second position.

According to advantageous but not mandatory aspects of the invention, such a passenger transport vehicle may incorporate one or more of the following features, taken in any combination that is technically feasible:

- the mechanical support structure is configured to form at least one ischiatic support for the passengers when the movable part is in the second position;
- the mechanical support structure comprises at least a first longitudinal bar which is fixedly installed inside the vehicle, a second longitudinal bar having a first end connected to the first longitudinal bar near a first end of the first longitudinal bar, and a third longitudinal bar having a first end slidably connected to the first longitudinal bar, and first connecting means configured to connect a second end of the second longitudinal bar to a second end of the third longitudinal bar, movably with respect to each other;
- the mechanical support structure comprises a plurality of first longitudinal bars which are fixedly installed within the vehicle at a distance from each other and aligned along a transverse axis, a plurality of second longitudinal bars, each second longitudinal bar having its first end connected to a corresponding first longitudinal bar, proximate to a first end of that corresponding first longitudinal bar and a plurality of third longitudinal bars, each third longitudinal bar having a first end slidably connected to a corresponding first longitudinal bar, and a plurality of first connecting means, each first connecting means being configured to connect a second end of a second longitudinal bar to a second end of a corresponding third longitudinal bar in a movable manner relative to each other;
- the or each first connecting means comprises a joint which is connected to the second end of the corresponding second longitudinal bar and to the second end of the corresponding third longitudinal bar;
- the mechanical support structure comprises second connection means configured to connect the second end of the or each second longitudinal bar to the or each corresponding first longitudinal bar, such that this second end is fixed along the corresponding first longitudinal bar while the or each second longitudinal bar can tilt relative to the corresponding first longitudinal bar;
- each second connection means comprises a hinge that is connected to the second end of the corresponding second longitudinal bar and to the corresponding first longitudinal bar;
- the mechanical support structure comprises third connection means configured to connect the second end of the or each third longitudinal bar to the or each corresponding first longitudinal bar, the or each third longitudinal bar being movable relative to the or each corresponding first longitudinal bar;

each third connecting means comprises a joint which is connected to the second end of the corresponding third longitudinal bar and to the corresponding first longitudinal bar;

the mechanical support structure further comprises at least a fourth longitudinal bar configured to connect two first connection means placed one after the other along the transverse axis;

the mechanical support structure comprises a plurality of fourth longitudinal bars, each fourth longitudinal bar being configured to connect two first connection means placed one after the other along the transverse axis;

the mechanical support structure further comprises at least a fifth longitudinal bar and fourth connection means which are configured to connect a first end of the fifth longitudinal bar to the first longitudinal bar, proximate to the second end of this first longitudinal bar, a free space being formed between the fifth longitudinal bar and the first longitudinal bar to accommodate at least a portion of the movable part when the movable part is in the second position;

the mechanical support structure comprises at least two fifth longitudinal bars and the fourth connection means are configured to connect the first end of each fifth longitudinal bar to a corresponding first longitudinal bar, proximate to the second end of that corresponding first longitudinal bar, a free space being formed between the fifth longitudinal bars and the corresponding first longitudinal bars to accommodate at least a portion of the movable part when the movable part is in the second position;

the fourth connection means are configured to allow rotation of each fifth longitudinal bar about the transverse axis relative to the corresponding first longitudinal bar;

each fourth connecting means comprises a joint connected to the first end of the corresponding fifth longitudinal bar and to the corresponding first longitudinal bar;

each fifth longitudinal bar is arranged with a second end, which is provided to rest on a body of the corresponding third longitudinal bar when the movable part is in the first position, and which is provided to slide on the body of and relative to the corresponding third longitudinal bar when the movable part is moved between the first position and the second position;

the mechanical support structure comprises an additional covering surface which is arranged on and connected to two of the fifth longitudinal bars, the additional covering surface being configured to form at least one backrest for the passengers;

the management system further comprises a control device installed on board the vehicle and configured to provide at least one remote control signal to activate, preferably substantially in real time, the movement of the movable part relative to the fixed part;

the management system comprises actuation means which are configured to move the at least one movable part between the first position and the second position as a function of a control signal emitted remotely by the control device;

the actuation means comprise at least one remotely controlled motor;

the at least one remotely controlled motor is a linear motor slidably mounted on the first longitudinal bar, being substantially solidary with the corresponding third longitudinal bar.

BRIEF DESCRIPTION OF THE DRAWINGS

Other aspects and advantages of the invention will become apparent upon reading the following description, given only as an example and with reference to the attached drawings, in which.

DETAILED DESCRIPTION OF THE PREFERRED EMBODIMENTS

It should be noted that in the detailed description that follows, identical or similar components, either from a structural and/or functional point of view, have the same reference numerals, regardless of whether they are shown in different embodiments of the present disclosure.

It should also be noted that in order to clearly and concisely describe the present disclosure, the drawings may not necessarily be to scale and certain features of the disclosure may be shown in somewhat schematic form.

Further, when the term "adapted" or "arranged" or "configured" is used herein while referring to any component as a whole, or to any part of a component, or to a combination of components, it has to be understood that it means and encompasses correspondingly either the structure, and/or configuration and/or form and/or positioning of the related component or part thereof such term refers to.

In particular, in relation to electronic and/or software means/modules, each of the above terms includes electronic circuits, as well as software codes and/or algorithms or complete programs stored or running.

In addition, where the terms "substantially" or "about" are used herein, they should be understood as encompassing a possible variation of plus or minus 5% from a stated reference value or position; furthermore, where the terms transverse or transversely are used herein, they should be understood as encompassing a direction not parallel to the reference part(s) or direction(s)/axis(es) to which they refer, and perpendicularity should be considered a particular kind of transverse direction.

Finally, throughout this document, the ordinal numbers first, second, third, etc. are used for the sake of clarity and should in no way be understood as limiting. In particular, the fact that a component is referred to as, for example, the "fourth component" does not necessarily imply the presence of preceding components as a "first component" or a "second component" or a "third component", unless such presence is clearly evident and necessary for the operation of an embodiment or embodiments described, nor does it imply that the order must be exactly the one laid out in the numerical sequence described with reference to the embodiment or embodiments illustrated.

Figure 1:
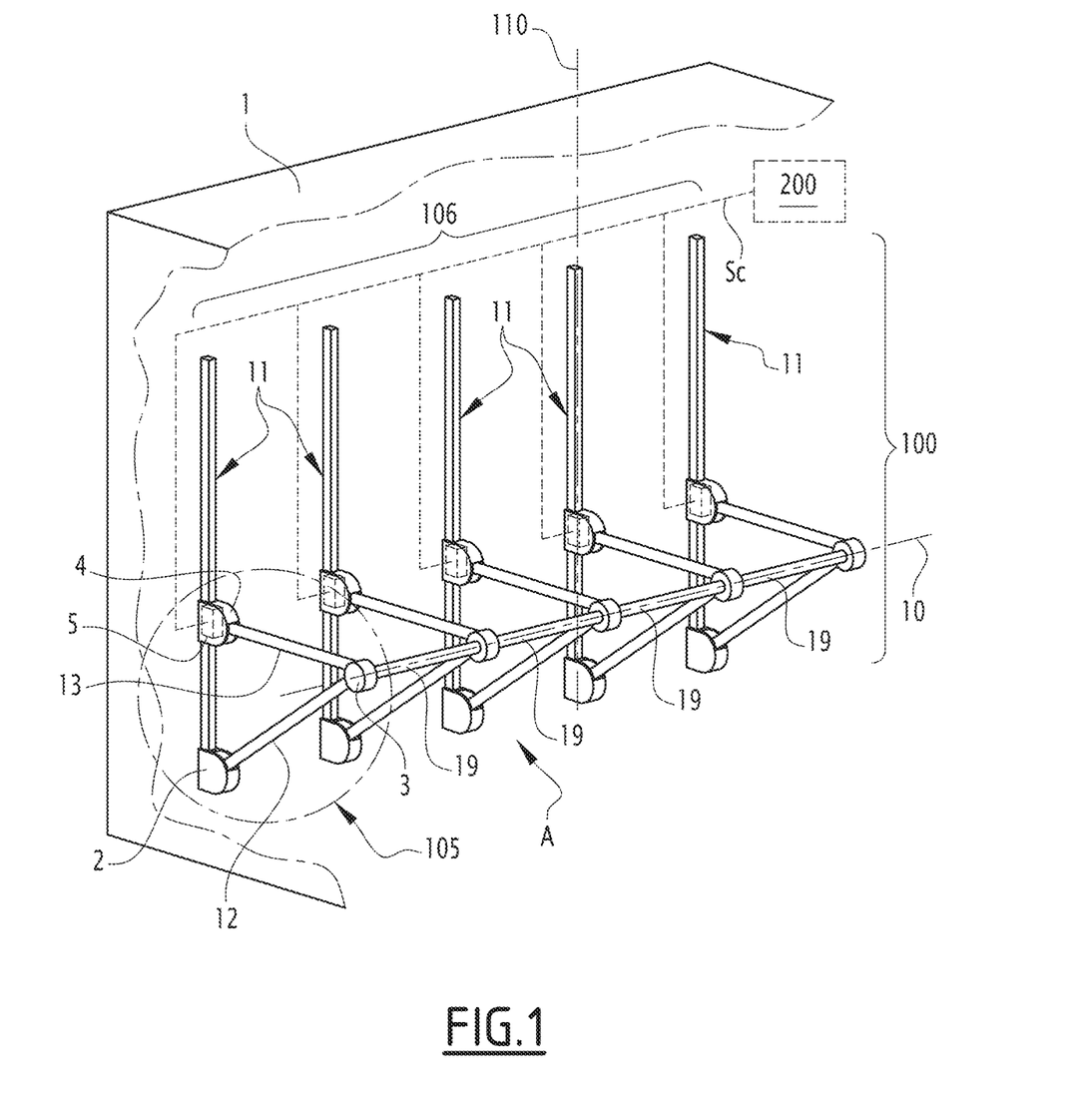
FIG. 1 is a view schematically illustrating the interior of a passenger transport vehicle according to the invention, having a mechanical support structure in a first configuration that can be used during a smooth passenger traffic condition.

FIG. 1 schematically illustrates the interior of a passenger transport vehicle according to the present invention, designated with the reference number 1. The definition of "passenger transport vehicle" used here must be interpreted in the broadest possible sense, meaning that it includes any type of passenger transport vehicle, and this definition may therefore also be considered to cover railway vehicles, such as trams, surface trains, and similar vehicles.

The vehicle 1 according to the present invention comprises a system for managing the space inside the vehicle 1, which is configured to modify the configuration of that space intended to accommodate passengers, and in particular to modify the number of available seating places based on the actual density of passengers to be transported, i.e. the level of passenger traffic to be transported.

Figure 2:
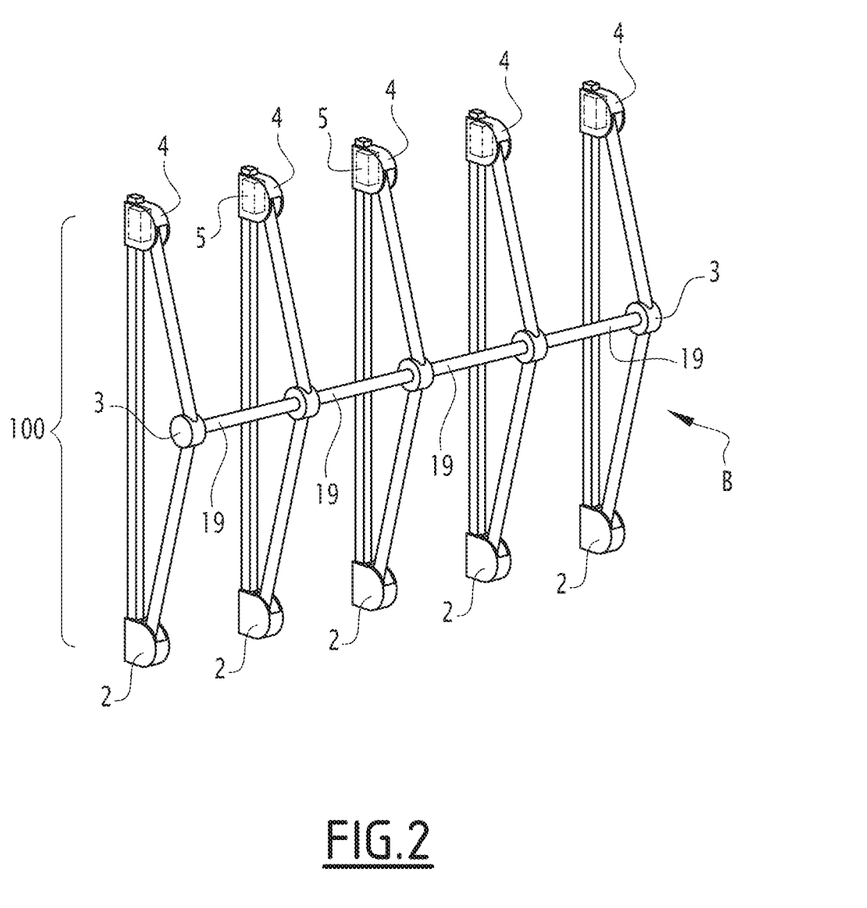
FIG. 2 is a view schematically illustrating the mechanical support structure shown in FIG. 1 in a second configuration that can be used during a more crowded passenger traffic condition.

In particular, the management system being used comprises at least one support structure, indicated as a whole with the reference number 100 in FIGS. 1 and 2, having a fixed part 106 and a movable part 105 which is movable, relative to the fixed part 106, between a first position, indicated in FIG. 1 by the letter A, in which the movable portion 105 is extended with respect to the fixed portion 106 so that the mechanical support structure 100 generally forms at least one available seating space for passengers, and a second position, indicated in FIG. 2 by the letter B, in which the movable portion 105 is retracted towards the fixed portion 106 so that the at least one seating space is unavailable for seating, thereby increasing the space available within the vehicle for standing passengers.

Figure 6:
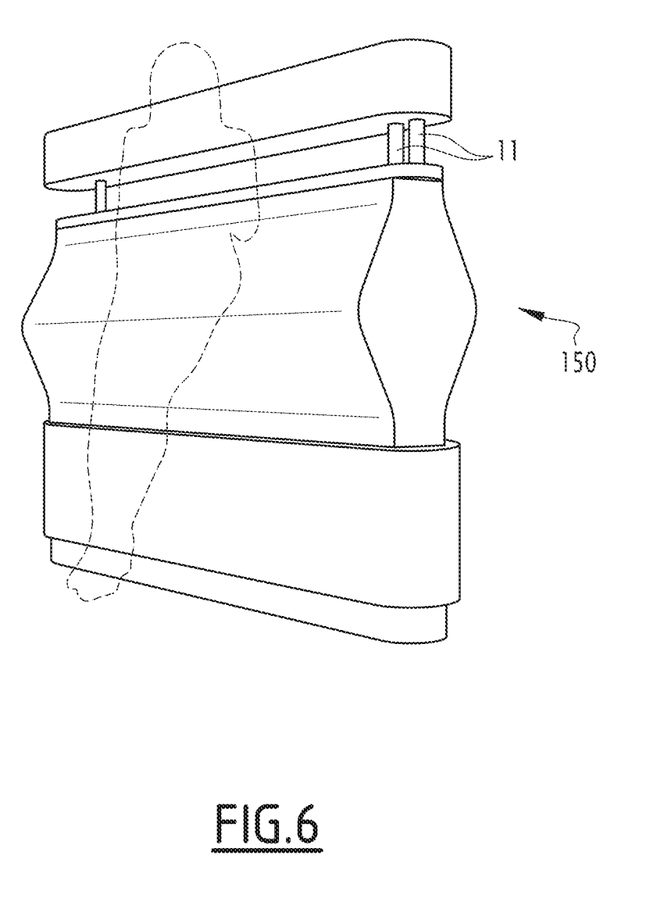
FIG. 6 is a schematic view of the mechanical support structure used in the vehicle according to the invention, in a second configuration forming an ischiatic support for passengers.
Figure 11:
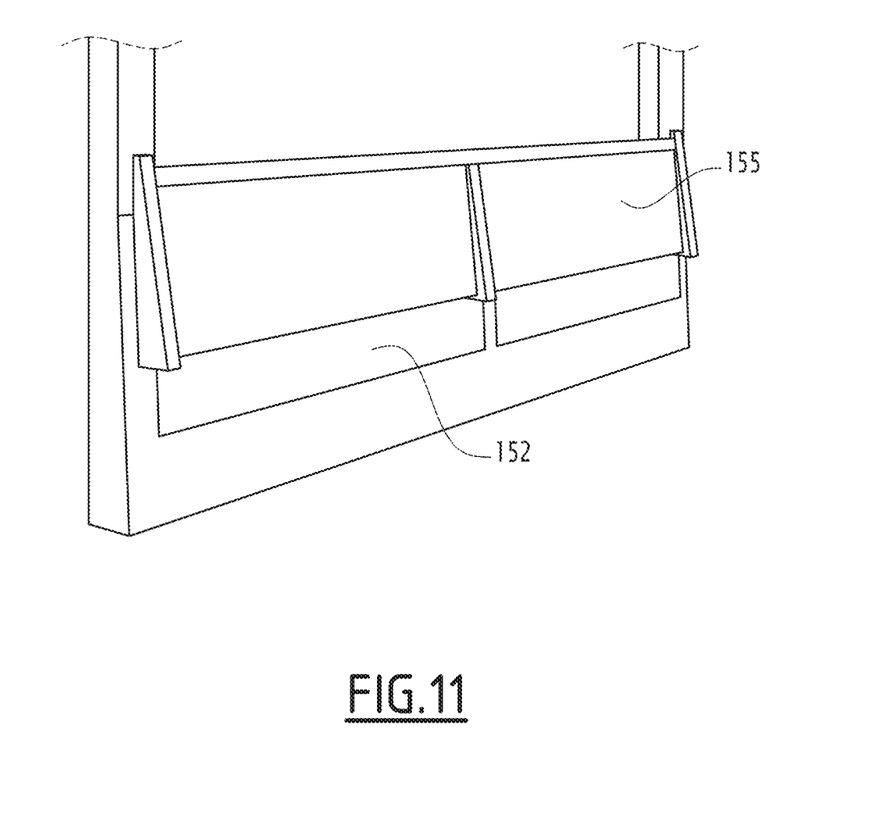
FIG. 11 is a perspective view showing the components of the mechanical support structure shown in FIG. 9 in the second position.

According to one possible embodiment, as illustrated for example in FIGS. 6 and 11, the mechanical support structure 100 is configured to form at least one ischiatic support for the passengers when the movable part 105 is in the second position.

According to one possible embodiment, the mechanical support structure 100 comprises at least one covering surface, indicated in FIG. 6 by the reference 150 which is connected to and is disposed around at least a portion of the movable part 105. In particular, the covering surface 150 and the movable part 105 are substantially solidary with each other and move together when the movable part 105 is moved relative to the fixed part 106.

Figure 5:
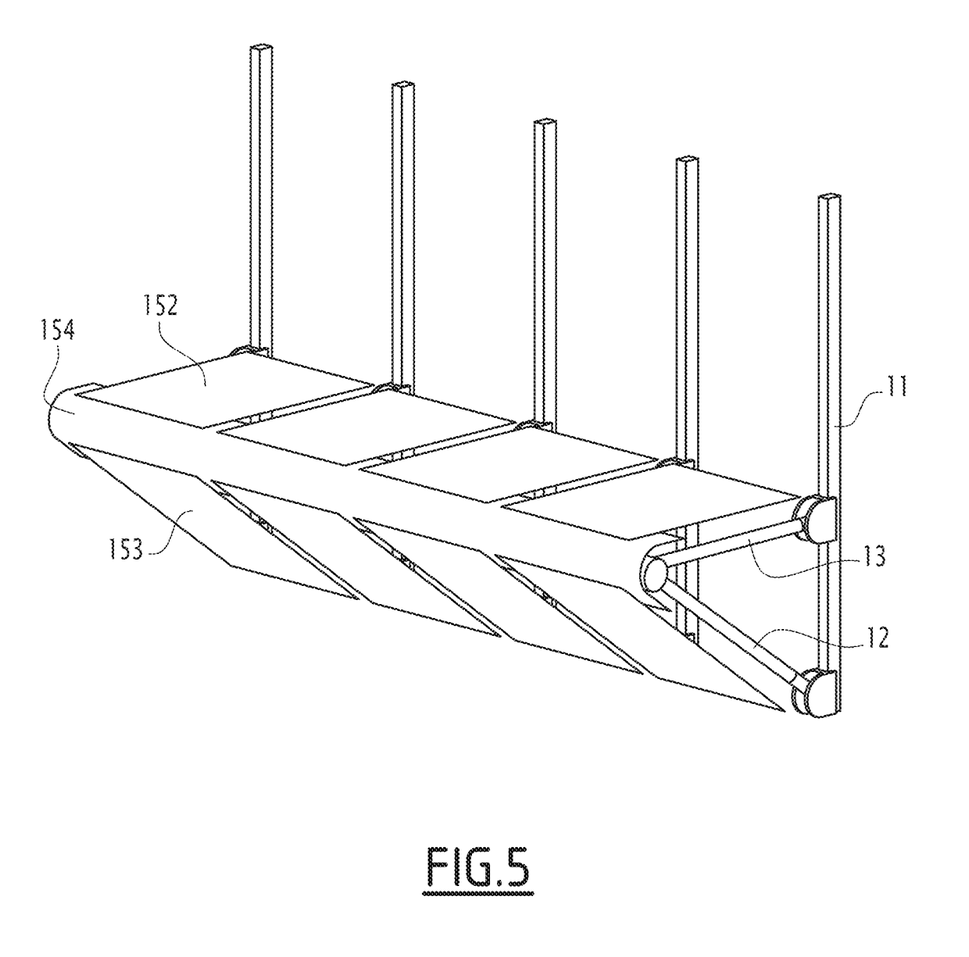
FIG. 5 is a schematically representative view of the components of the mechanical support structure used in the vehicle according to the invention, in a first configuration forming at least one seating place available for passengers.
Figure 10:
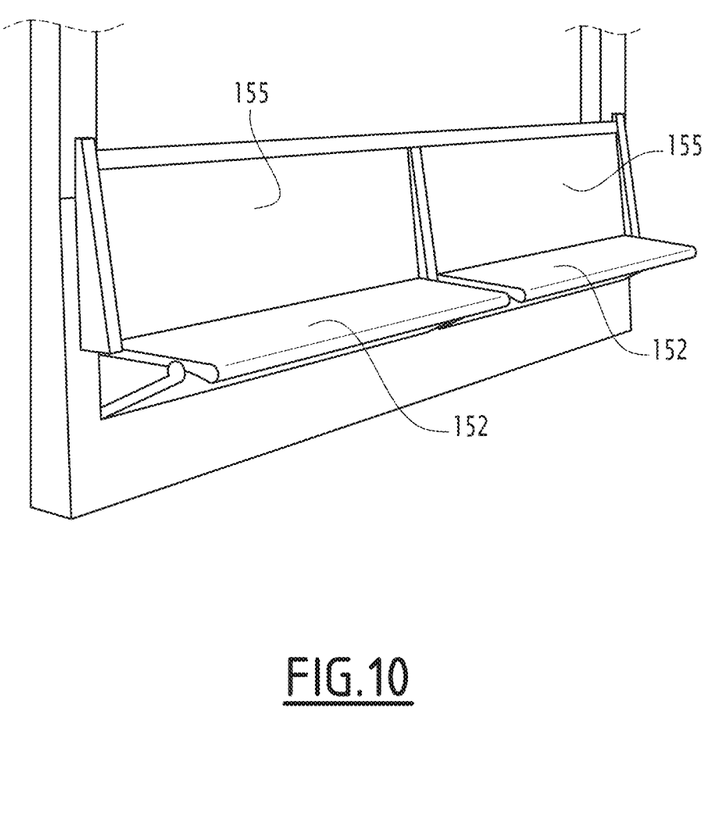
FIG. 10 is a perspective view showing the components of the mechanical support structure shown in FIG. 7 in the first position.

In particular, as illustrated in FIGS. 5 and 10, the or each covering surface 150 comprises at least a first substantially rigid portion 152 forming a seating surface when the movable part 105 is in the first position A.

According to one possible embodiment, illustrated in FIG. 5, the covering surface 150 comprises a second substantially rigid portion 153, and a third deformable portion 154 which is disposed between the first and second substantially rigid portions 152 and 153 and which is connected to the first substantially rigid portion 152 and the second substantially rigid portion 153 such that the first and second substantially rigid portions form with the third deformable portion 154 an ischiatic support surface when the movable part 105 is in the second position B.

According to one possible alternative embodiment, as illustrated in FIGS. 10 and 11, the mechanical support structure 100 comprises an additional covering surface, indicated by reference 155, which is separate from the rigid portion 152 forming a seating surface when the movable part 105 is in the first position A. In particular, the additional covering surface 155 is connected to at least two fifth longitudinal bars 16, and is configured to form at least one backrest for the passengers.

According to one possible embodiment, illustrated in FIGS. 1 to 5, the mechanical support structure 100 comprises at least:
- a first longitudinal bar 11 which is fixedly installed inside the vehicle 1;
- a second longitudinal bar 12 having a first end 22 connected to the first longitudinal bar 11, in proximity to a first end 21 of the first longitudinal bar 11; and
- a third longitudinal bar 13 having a first end 33 slidably connected to the first longitudinal bar 11; and
- first connection means 3 configured to connect a second end 32 of the second longitudinal bar 12 to a second end 23 of the third longitudinal bar 13 in an articulated manner with respect to each other.

In particular, according to a possible embodiment, the mechanical support structure 100 shown in FIGS. 1 to 5 comprises:
- a plurality of first longitudinal bars 11 which are fixedly installed inside the vehicle 1 at a distance from each other and aligned along a transverse axis 10;
- a plurality of second longitudinal bars 12, each second longitudinal bar 12 having its first end 22 connected to a corresponding first longitudinal bar 11 in proximity to a first end 21 of that corresponding first longitudinal bar 11; and
- a plurality of third longitudinal bars 13, each third longitudinal bar having a first end 33 slidably connected to a corresponding first longitudinal bar 11; and
- a plurality of first connection means 3, each first connection means 3 being configured to connect a second end 32 of a second longitudinal bar 12 to a second end 23 of a corresponding third longitudinal bar 13 in an articulated manner to each other.

The term longitudinal is to be understood here as indicating a body having a dimension measured in one direction, for example for the first bar 11 along its longitudinal axis indicated in FIG. 1 by the reference number 110, which is substantially greater than the other two dimensions.

Figure 4:
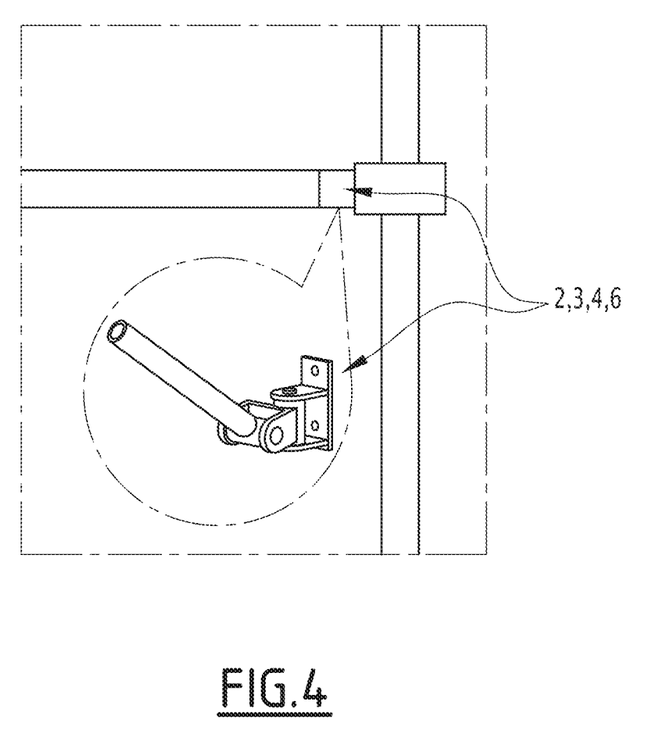
FIG. 4 is a schematic view of one possible embodiment of some of the connecting means used in the passenger transport vehicle according to the invention.

In particular, the or each first connection means 3 comprises a joint, an example of a possible embodiment of which is illustrated in FIG. 4.

In particular, this joint is positioned between and connected to the second end 32 of the corresponding second longitudinal bar 12 and the second end 23 of the corresponding third longitudinal bar 13, and allows rotation about the axis of the joint of each third longitudinal bar 13 relative to each corresponding second longitudinal bar 12.

Furthermore, the mechanical support structure 100 comprises second connection means 2 configured to connect the second end 22 of the or each second longitudinal bar 12 to the first end 21 of the or each corresponding first longitudinal bar 11.

In this way the second end 22 of the or each second longitudinal bar 12 is fixed along the corresponding longitudinal bar 11, with the or each second longitudinal bar 12 being tiltable relative to that corresponding longitudinal bar 11.

In particular, each second connection means 2 comprises a joint, a possible embodiment of which is illustrated in FIG. 4, which is connected to the second end 22 of the corresponding second longitudinal bar 12 and to the first end 21 of the corresponding first longitudinal bar 11.

According to a possible embodiment, the mechanical support structure 100 further comprises third connection means 4 configured to connect the second end 33 of the or each third longitudinal bar 13 to the or each corresponding first longitudinal bar 11, in a movable manner with respect to each other.

In particular, each third connection means 4 comprises a joint, a possible embodiment of which is also illustrated in FIG. 4, which is connected to the second end 33 of the corresponding third longitudinal bar 13 and to the corresponding first longitudinal bar 11.

As illustrated in FIGS. 1 and 2, the mechanical support structure 100 further comprises at least a fourth longitudinal bar 19 configured to connect two first connection means 3 placed one after the other along the transverse axis 10.

According to one possible embodiment, the mechanical support structure 100 comprises a plurality of fourth longitudinal bars 19, each fourth longitudinal bar 19 being configured to connect two first connection means 3 placed one after the other along the transverse axis 10.

In particular, the fixed part 106 of the support structure 100 comprises at least the first longitudinal bar(s) 11 which are installed in the vehicle 1 at a distance from each other along the transverse axis 10, e.g. in a substantially vertical position, and which have for example the shape of a track. The movable part 106 comprises at least the second longitudinal bar(s) 12, the third longitudinal bar(s) 13, the fourth longitudinal bar(s) 19, and the connecting means 2, 3, 4.

According to one possible embodiment, as illustrated in FIGS. 3 and 7 to 9, the mechanical support structure 100 further comprises at least one fifth longitudinal bar 16 and fourth connection means 6 which are configured to connect a first end 26 of the fifth longitudinal bar 6 to the first longitudinal bar 11, proximate to the second end 31 of that first longitudinal bar 11.

Preferably, the mechanical support structure 100 comprises a plurality of fifth longitudinal bars 16, i.e. at least two longitudinal bars 16, and a plurality of fourth connection means 6 which are configured to connect a first end 26 of each fifth longitudinal bar 6 to a corresponding first longitudinal bar 11, in the vicinity of the second end 31 of this corresponding first longitudinal bar 11.

In particular, a free space 37 is formed between the or each fifth longitudinal bar 16 and the or each first longitudinal bar 11 to accommodate at least a portion of the movable part 105 when the movable part 105 is in the second position B.

According to one possible embodiment, the fourth connection means 6 are configured to allow rotation of each fifth longitudinal bar 16 about the transverse axis 10 with respect to the corresponding first longitudinal bar 11.

In particular, each fourth connecting means 6 comprises a joint connected to the first end 26 of the corresponding fifth longitudinal bar 16 and to the corresponding first longitudinal bar 11. An example embodiment of each connection means is shown in FIG. 4.

Figure 3:
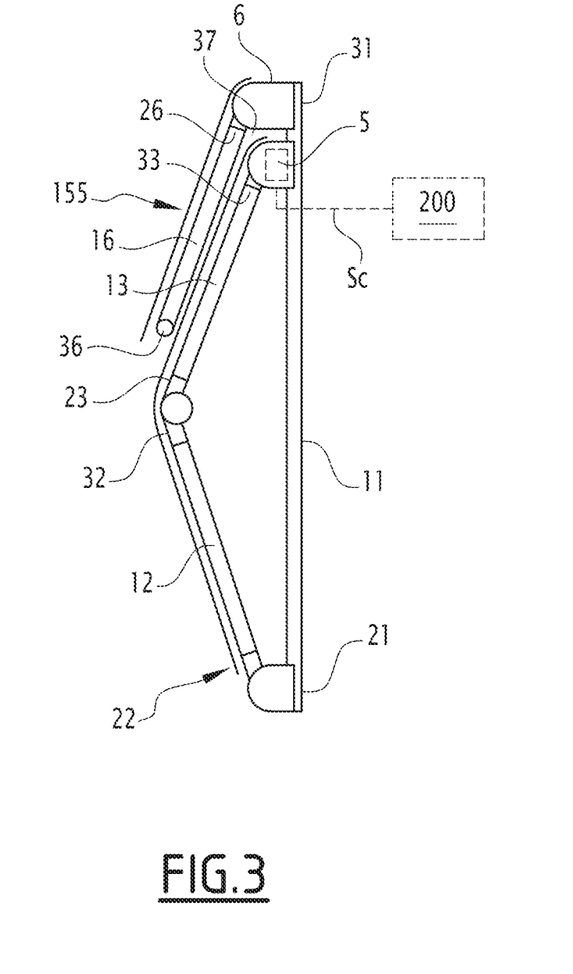
FIG. 3 is a schematic view of the components used in the passenger transport vehicle according to the invention, according to a first exemplary embodiment.

In the embodiment shown in FIG. 3, each fifth longitudinal bar 16 is connected to a corresponding first longitudinal bar 11, with its second end 36 free and suspended in the air. In addition, at least one additional covering surface 155 is disposed on and connected to at least two of the fifth longitudinal bars 16, and is configured to form at least one backrest for passengers.

Figure 7:
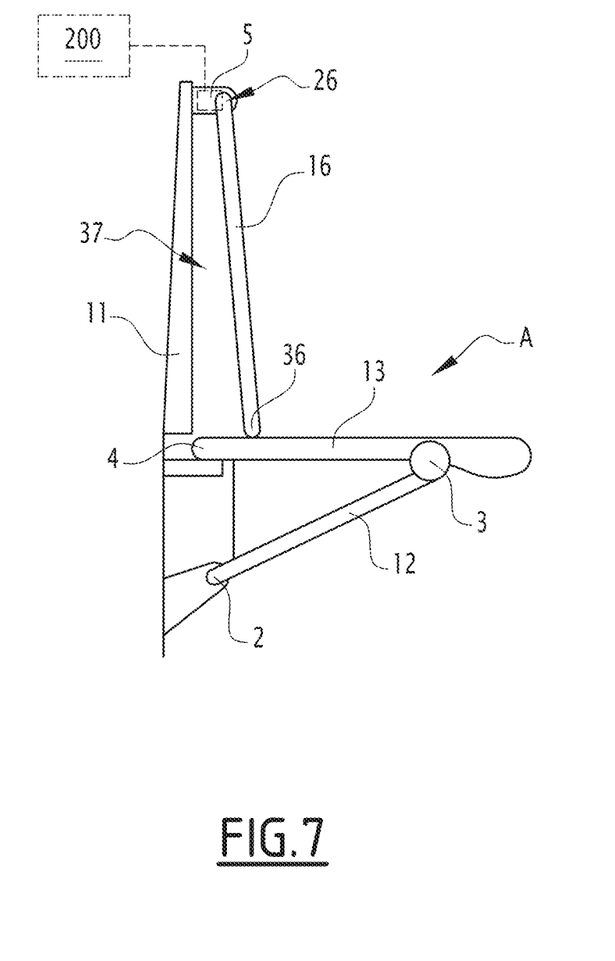
FIG. 7 is a side view schematically illustrating a second embodiment of certain components of the mechanical support structure used in the vehicle according to the invention, in a first position forming at least one seating place available for passengers.
Figure 8:
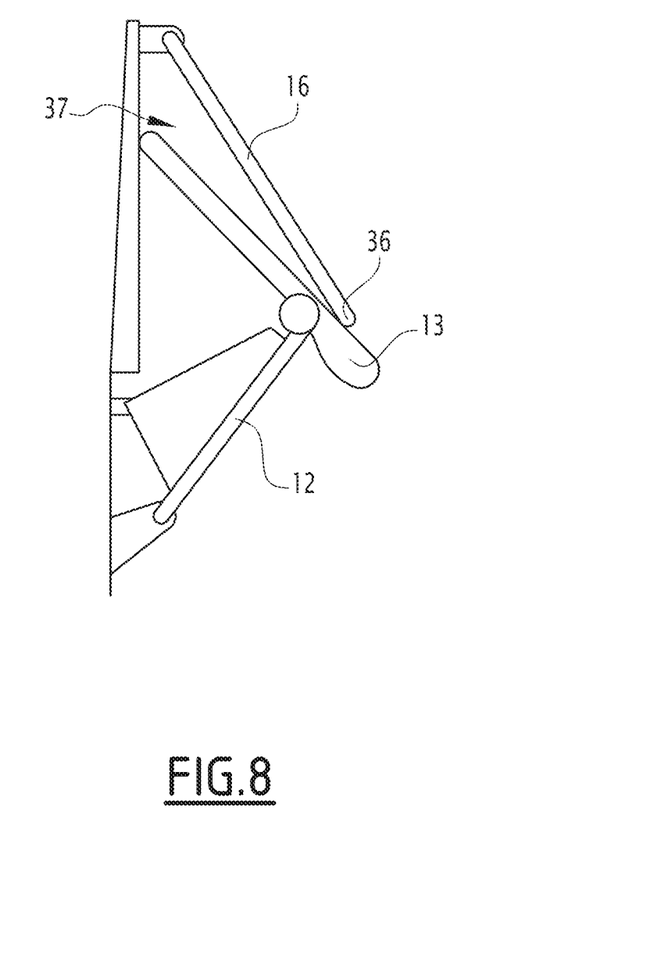
FIG. 8 is a side view schematically depicting the components of the mechanical structure shown in FIG. 7 in an intermediate position.
Figure 9:
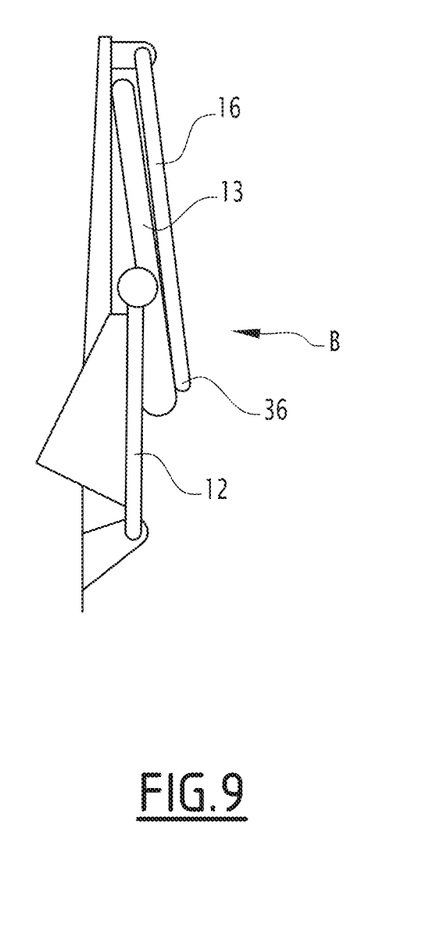
FIG. 9 is a side view schematically depicting the components of the mechanical structure shown in FIGS. 7 and 8 in a second position forming an ischiatic support for the passengers.

According to the embodiment illustrated in FIGS. 7 to 11, each fifth longitudinal bar 16 is arranged such that its second end 36 is provided to bear against a body of the corresponding third longitudinal bar 13 when the movable part 105 is in the first position A, and is provided to slide on the body of and relative to the corresponding third longitudinal bar 13 when the movable part 105 is moved between the first position A and the second position B, as illustrated by the positions illustrated in sequence in FIGS. 7 to 9.

In this embodiment, an additional covering surface 155 is also arranged on and is connected to at least two of the fifth longitudinal bars 16, and is configured to form at least one backrest for the passengers, as illustrated in FIG. 10 where the movable part of the structure 100 is in the first position A forming seating places, and in FIG. 11 where the structure 100 is in the second position B.

According to one possible embodiment of the vehicle 1 according to the invention, the space management system comprises at least one control device 200, schematically represented in FIGS. 1, 3 and 7 as a box drawn in dotted lines, which is configured to generate at least one remote control signal $S_c$ suitable for activating the modification of the number of seating places available for the passengers, and in particular for activating, preferably substantially in real time, the displacement of the movable part 105 with respect to the fixed part 106.

Preferably, the control device 200 is configured to generate the control signal $S_c$ remotely from the position of the seating places to be changed, i.e. away from the seating places, and in particular where passengers cannot activate it.

Preferably, the control device 200 is installed on board the vehicle 1, for example in the cockpit or cabin of the vehicle 1, or in any position inaccessible to passengers, and is configured to activate the modification of the number of seating places available for passengers, substantially in real time during the movement of the vehicle 1, in particular according to the actual conditions of passenger traffic.

For example, an operator in the vehicle 1 can activate the modification of the number of seating places available for passengers on the basis of his direct view or according to images provided by video cameras. These video cameras can be mounted, for example, in the passenger area and/or on station platforms, and can monitor the actual density of passengers to be carried.

Furthermore, the management system used in the vehicle 1 according to the invention comprises actuation means schematically represented in FIGS. 1, 3 and 7 as a dotted box 5, which are configured to move the or each movable part 105 between the first position A and the second position B, as a function of the control signal $S_c$ received and which has been transmitted by the control device 200.

In particular, the actuation means 5 comprise at least one motor remotely controlled by the control device 200.

According to one possible embodiment, the or each remotely controlled motor is a linear motor which is mounted on a first longitudinal bar 11 and which slides, along the body of this first longitudinal bar 11, moving in a substantially solidary manner with the corresponding third longitudinal bar 13 and second longitudinal bar 12.

Preferably, the actuation means 5 comprises a plurality of remotely controlled motors, in particular two or more linear motors, each motor being mounted on a corresponding first longitudinal bar 11 and sliding, along the body of this corresponding first longitudinal bar 11, in a substantially solidary manner with the third longitudinal bar 13 and the second longitudinal bar 12 associated with this first longitudinal bar 11.

It is clear from the above description that the passenger transport vehicle 1 achieves the purpose behind the present invention because the space available inside the vehicle can be managed more efficiently compared to known solutions. In the vehicle 1 according to the invention, the space inside the vehicle is used optimally during both off-peak and peak service hours. In particular, the internal configuration of the vehicle can be adapted to traffic in real time: when the passenger traffic is fluid, the number of available seating places is increased; on the contrary, when the traffic is more crowded, these seating places, individual or grouped together for example in the form of benches, are retracted, freeing up all the space so as to allow as many passengers as possible to have standing room. In this configuration, the capacity gain is optimal.

These results are achieved with a solution that is relatively simple in construction and very flexible in application.

The vehicle 1 designed in this way is subject to modification and variation. For example, the movable covering surfaces which form the available seating places and/or the ischiatic support, may be in the form of a sliding bench comprising a plurality of seating places or seats, placed side by side, as illustrated in FIGS. 5 to 6 and 10 to 11, or they may form individual seating places or ischiatic supports. A combination of seats or seating places in the form of benches or the like, and individual seats or seating places can be created. In addition, the movable seating places may be positioned along the central corridor of the vehicle 1 and/or along the sides; the control device 200 may be configured to selectively move a number of movable seats and not all at the same time; the bars used may have a different shape compared to the shapes illustrated in the figures; the connection position, for example of each second longitudinal bar 12 along the body of a corresponding first longitudinal bar 11, may be different; each fifth longitudinal bar 16 may be fixedly connected to a first longitudinal bar 11.

All the details may furthermore be replaced with technically equivalent elements.

What is claimed is:

1. A passenger transport vehicle comprising a system for managing the space inside the vehicle which is configured to vary the number of available seating places in accordance with the level of passenger traffic to be transported, the management system comprising
    at least one mechanical support structure having a fixed part and a movable part which is movable, relative to the fixed part, between a first position in which the movable part is extended relative to the fixed part so that the mechanical support structure forms at least one available seating place for passengers, and a second position in which the movable part is retracted towards the fixed part so that the at least one seating place is unavailable for seating,
    wherein the mechanical support structure comprises at least one covering surface which is connected to and is disposed around at least a portion of the movable part, the covering surface and the movable part moving together substantially solidary with each other, and
    wherein the at least one covering surface comprises at least a first substantially rigid portion, a second substantially rigid portion, and a third deformable portion which is disposed between the first and second substantially rigid portions and which is connected to the first substantially rigid portion and the second substantially rigid portion, the first substantially rigid portion forming a seating surface when the movable part is in the first position, while the first and second substantially rigid portions form with the third deformable portion an ischiatic support surface when the movable part is in the second position,
    wherein the fixed part of the mechanical support structure comprises at least:
        a first longitudinal bar which is fixedly installed inside the vehicle;
    and wherein the movable part of the mechanical support structure comprises at least:
        a second longitudinal bar having a first end connected to the first longitudinal bar, in proximity to a first end of the first longitudinal bar; and
        a third longitudinal bar having a first end slidably connected to the first longitudinal bar; and
        first connection means configured to connect a second end of the second longitudinal bar to a second end of the third longitudinal bar in an movable manner one with respect to the other.

2. The vehicle as in claim 1, wherein the mechanical support structure is configured to form at least one ischiatic support for the passengers when the movable part is in the second position.

3. The vehicle as in claim 1, wherein the fixed part of the mechanical support structure comprises a plurality of first longitudinal bars which are fixedly installed within the vehicle at a distance from each other and aligned along a transverse axis, and wherein the movable part of the mechanical support structure comprises a plurality of second longitudinal bars, a plurality of third longitudinal, and a plurality of first connecting means, each second longitudinal bar having its first end connected to a corresponding first longitudinal bar, proximate to a first end of the corresponding first longitudinal bar, each third longitudinal bar having a first end slidably connected to a corresponding first longitudinal bar, and each first connecting means being configured to connect a second end of a second longitudinal bar to a second end of a corresponding third longitudinal bar in a movable manner relative to each other.

4. The vehicle as in claim 1, wherein the fixed part of the mechanical support structure comprises second connection means configured to connect the second end of the or each second longitudinal bar to the or each corresponding first longitudinal bar, such that said second end is fixed along the corresponding first longitudinal bar while the or each second longitudinal bar is tiltable relative to the corresponding first longitudinal bar.

5. The vehicle as in claim 4, wherein the fixed part of the mechanical support structure comprises third connection means configured to connect the second end of the or each third longitudinal bar to the or each corresponding first longitudinal bar, the or each third longitudinal bar being movable relative to the or each corresponding first longitudinal bar.

6. The vehicle as in claim 1, wherein the or each first connecting means comprises a joint which is connected to the second end of the corresponding second longitudinal bar and to the second end of the corresponding third longitudinal bar.

7. The vehicle as in claim 5, wherein the fixed part of the mechanical support structure comprises a plurality of fourth longitudinal bars, each fourth longitudinal bar being configured to connect two first connection means placed one after the other along a transverse axis.

8. The vehicle as in claim 7, wherein the fixed part of the mechanical support structure further comprises at least a fifth longitudinal bar and fourth connection means which are configured to connect a first end of the fifth longitudinal bar to the first longitudinal bar, proximate to the second end of this first longitudinal bar, a free space being formed between the fifth longitudinal bar and the first longitudinal bar to accommodate at least a portion of the movable part when the movable part is in the second position.

9. The vehicle as in claim 8, wherein the fixed part of the mechanical support structure comprises at least two fifth longitudinal bars and the fourth connection means are configured to connect the first end of each fifth longitudinal bar to a corresponding first longitudinal bar, proximate to the second end of that corresponding first longitudinal bar, a free space being formed between the fifth longitudinal bars and the corresponding first longitudinal bars to accommodate at least a portion of the movable part when the movable part is in the second position.

10. The vehicle as in claim 9, wherein the fourth connection means are configured to allow rotation of each fifth longitudinal bar about a transverse axis relative to the corresponding first longitudinal bar.

11. The vehicle as in claim 1, wherein the management system further comprises a control device installed on board the vehicle and configured to provide at least one remote control signal for activating the displacement of the movable part relative to the fixed part.

12. The vehicle as in claim 11, wherein the management system comprises actuation means which are configured to move the at least one movable part between the first position and the second position as a function of a control signal emitted remotely by the control device.

13. The vehicle as claimed in claim 12, wherein the actuation means comprises at least one remotely controlled motor.

14. The vehicle as claimed in claim 13,
wherein the at least one remotely controlled motor is a linear motor which is slidably mounted on the first longitudinal bar and moves substantially solidary with the corresponding third longitudinal bar.

* * * * *